United States Patent [19]

Kurogane et al.

[11] Patent Number: 5,148,294
[45] Date of Patent: Sep. 15, 1992

[54] IMAGE PROCESSING APPARATUS AND METHOD FOR PAINTING A MEMORY WITH PLURAL COLORS

[75] Inventors: Toshio Kurogane; Nagaoka Daiji; Hiroshi Sekine, all of Kanagawa, Japan

[73] Assignee: Fuji Xerox Corporation, Ltd., Tokyo, Japan

[21] Appl. No.: 470,352

[22] Filed: Jan. 25, 1990

[30] Foreign Application Priority Data

Jan. 27, 1989 [JP] Japan ................................. 1-18876
Jun. 29, 1989 [JP] Japan ................................. 1-169247

[51] Int. Cl.⁵ ............................................. H04N 1/46
[52] U.S. Cl. ..................................... 358/448; 358/80; 358/452
[58] Field of Search ............ 358/78, 75, 80, 79, 358/447, 448, 450, 452, 464, 471, 453, 457; 382/54, 62

[56] References Cited

U.S. PATENT DOCUMENTS

| | | | |
|---|---|---|---|
| 4,608,596 | 8/1986 | Williams | 358/75 |
| 4,730,185 | 3/1988 | Springer et al. | 340/201 |
| 4,896,208 | 1/1990 | Moriya et al. | 358/75 |
| 4,987,497 | 1/1991 | Yoshimura | 358/448 |
| 5,081,527 | 1/1992 | Naito | 358/75 |

FOREIGN PATENT DOCUMENTS 1-168163  7/1989  Japan .
2213344A 12/1987  United Kingdom .

Primary Examiner—Edward L. Coles, Sr.
Assistant Examiner—Jerome Grant, II
Attorney, Agent, or Firm—Finnegan, Henderson Farabow, Garrett and Dunner

[57] ABSTRACT

An apparatus and method for editing an entire image, including closed areas surrounded by other closed areas, contained within a framed area is disclosed. Image data obtained through a prescan is first written into a bit map memory, in the form of first data, e.g., 5. A closed area containing a point designated by a user is then painted with data of 3, for example. The entire area outside the closed area is painted with third data of 1, for example, using a start point that is a point outside the area of the original. Further, the bit map memory is painted with fourth data, e.g., a function number N corresponding to the type of the preset image edit processing, with the designated point as a start point of the painting and the third data as a pattern delineating the area painted with the fourth data. Through the above steps of processing, the framed area is entirely painted with the number N. Then, the number N is set to the value corresponding to the type of image edit processing. The contents of the bit map memory are then read in synchronism with the reading of the image on the original by a regular scan. The read image data of the original is processed in a predetermined manner on the basis of the number N as read.

20 Claims, 14 Drawing Sheets

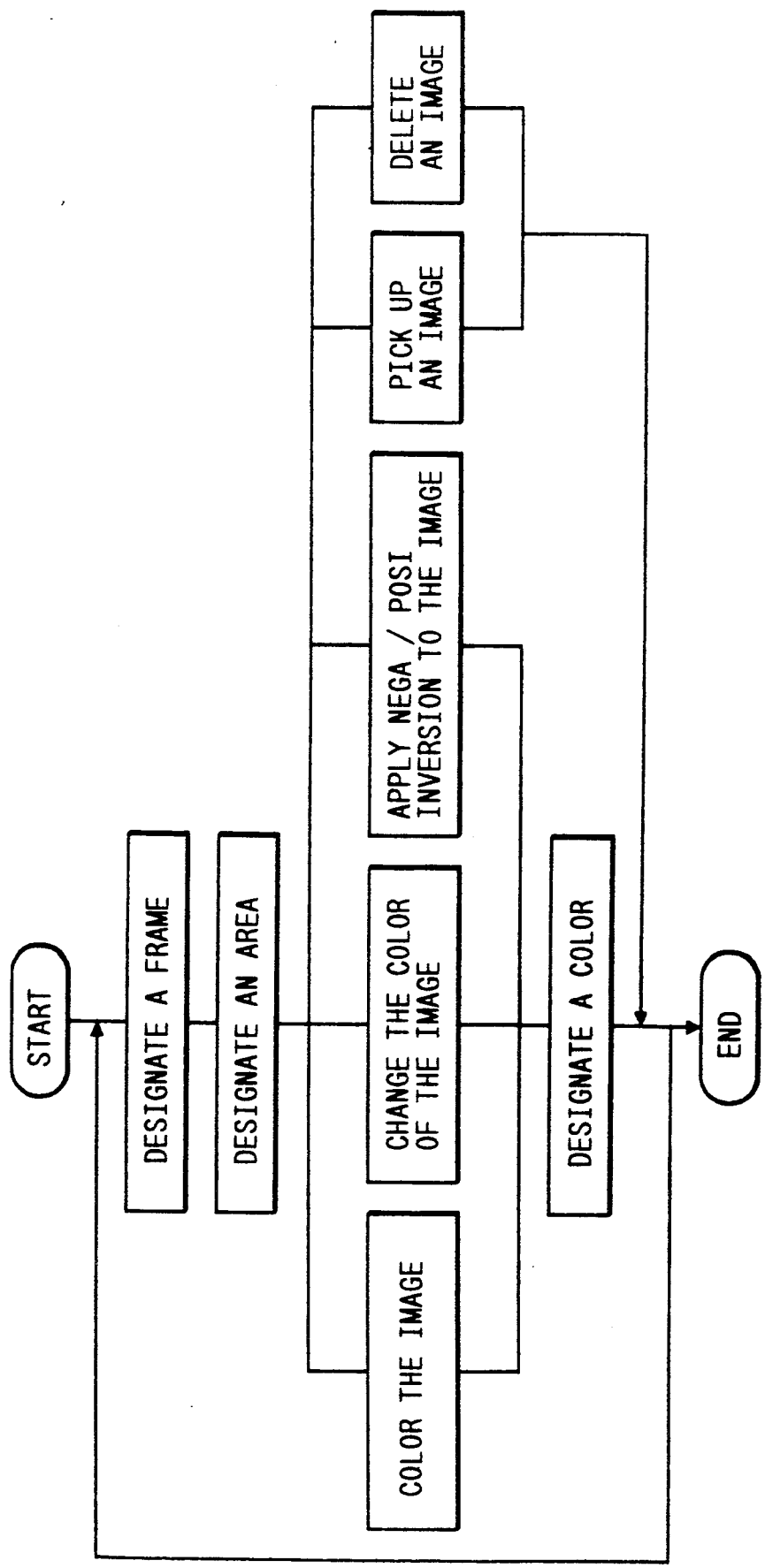

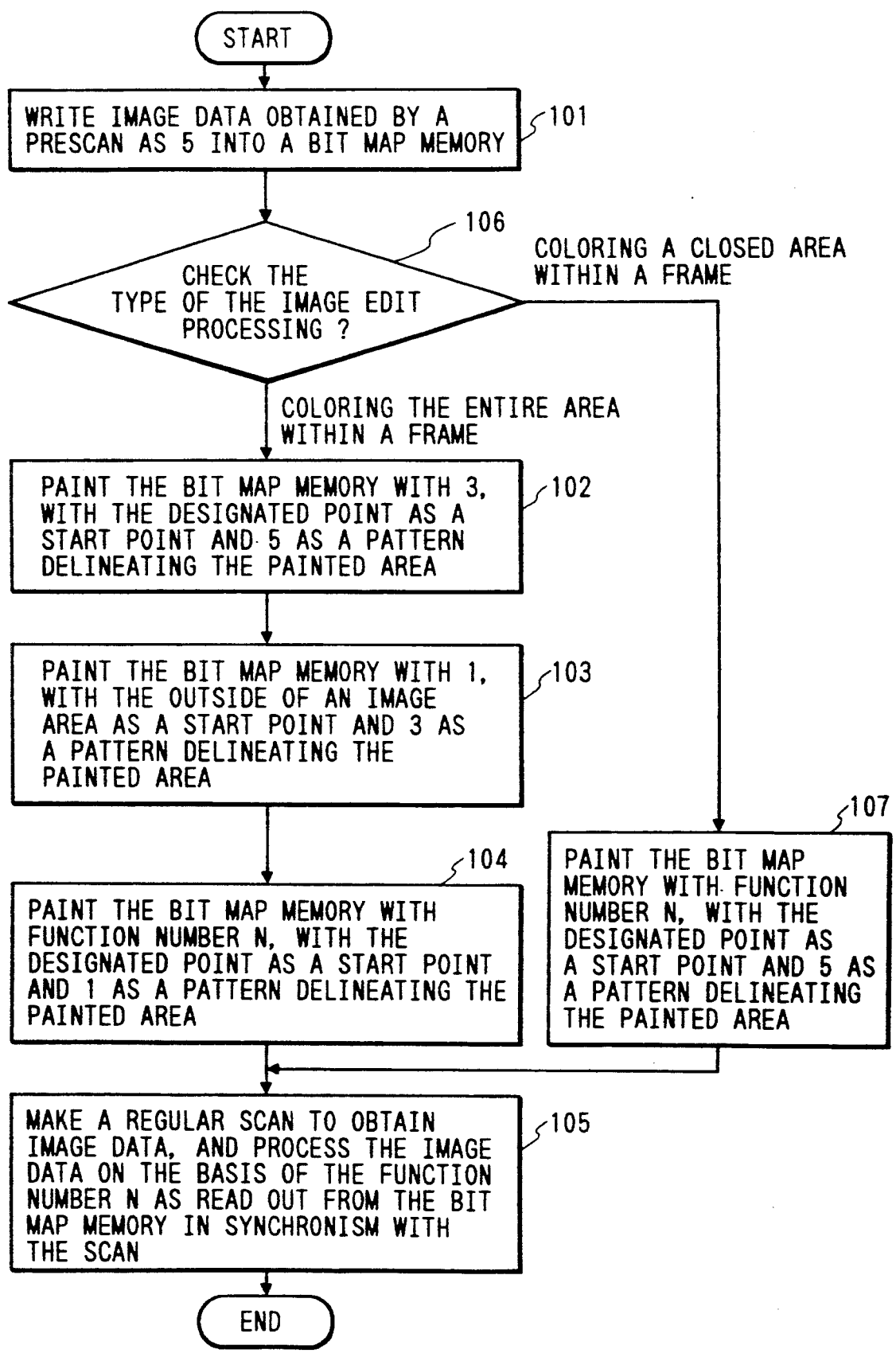

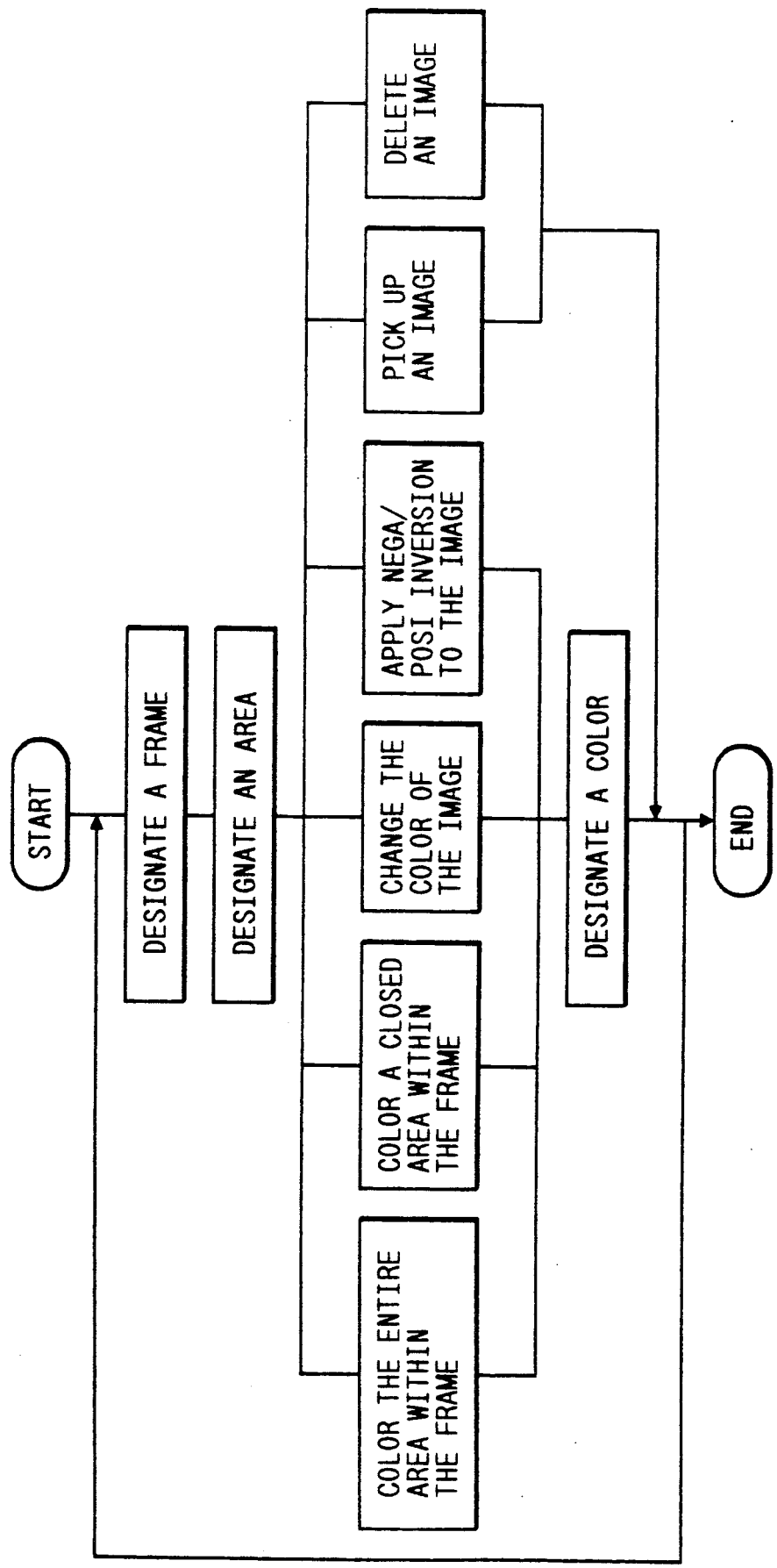

FIG. 12
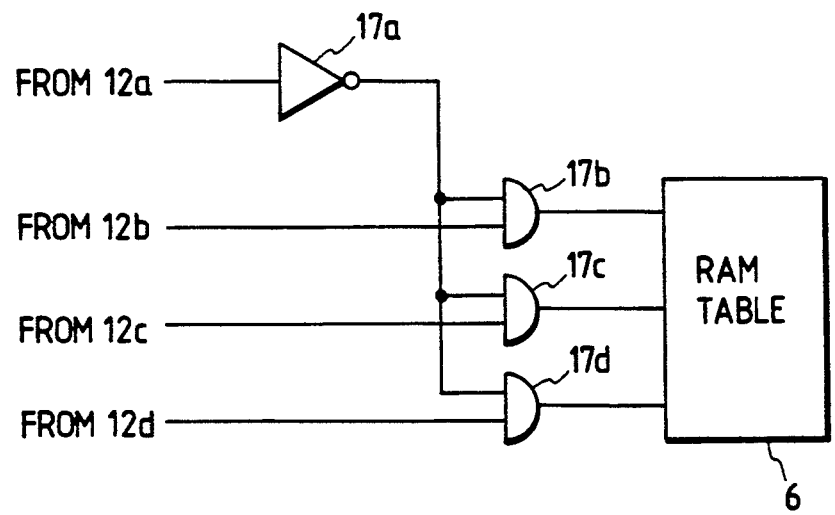
FIG. 13(a)
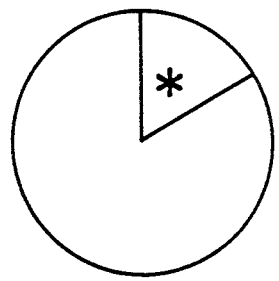
FIG. 13(b)
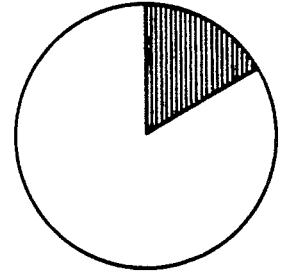
FIG. 14(a)  FIG. 14(b)  FIG. 14(c)  FIG. 14(d)
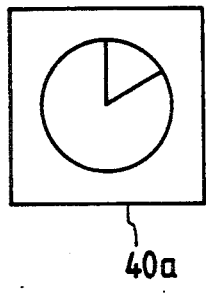  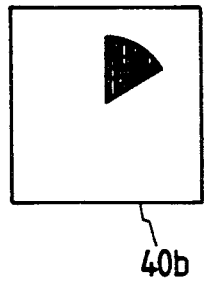  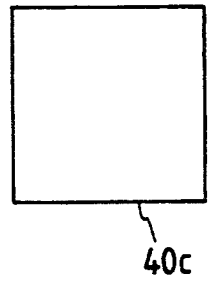  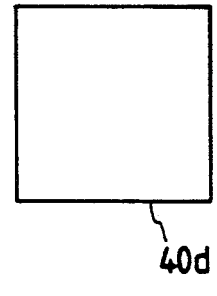

IMAGE PROCESSING APPARATUS AND METHOD FOR PAINTING A MEMORY WITH PLURAL COLORS

BACKGROUND OF THE INVENTION 1. FIELD OF THE INVENTION

The present invention relates to an apparatus and method for reading image information and applying various types of processing to the image information, and more particularly to an apparatus and method for applying a certain type of image processing to a designated area of the image, which differs from processing applied to other areas.

2. DESCRIPTION OF RELATED ART

In a general image processor, an image of an original is read by an image input unit and converted into an electrical image signal. The image signal is subjected to various types of processing, and finally is output as a visual image through an image output unit such as a laser printer, for example.

An image processor of the type in which a part of an area of an image of an original is designated, and is subjected to certain types of image processing, which is different from that in other areas, is disclosed in Japanese Patent Application Unexamined Publication Nos. 60-242480 and 60-213168. When the image processor is applied to a copying machine, it is possible to edit the designated area alone with various functions, such as delete, pick-up, color-change, negative/positive-inversion, and coloring.

In the copying machine having such edit functions, an area to be edited must be designated before copying. To this end, the coordinates of an original are entered by using numerical keys and a digitizer, to designate a closed area. For example, the coordinates of two vertices on diagonals are designated to set up a rectangular area. Multiple points on the original image are successively designated to set up a polygonal area.

When the above methods are used, it is difficult to accurately designate only a desired area. FIG. 13(a) shows a wedge like portion marked with an asterisk (*) in a circle graph of an original which is to be colored and copied to obtain an image as shown in FIG. 13(b). To designate the area, an operator visually picks up and manually enters the coordinates. In this example, it is necessary to enter the coordinates of many points along a circular arc of the fan. Entering such data is troublesome and time-consuming work. Reduction of the number of coordinates entered, however, decreases the accuracy of the area designation. In addition, mechanical error and error due to incorrect placement of an original coordinate inherently exist. Consequently, the actual location of the image read by the image input unit typically does not exactly correspond to the location of the image expressed by the entered coordinates.

To address this problem, in Japanese Patent Application No. 62-328060, Applicants of the present patent application proposed an image processor using two scans. A prescan reads an image of an original and to detect a closed area, and subsequently a regular scan performs actual image processing on the basis of the detected closed area. More specifically, the processor reads an image of an original through a prescan, and forms a bit pattern corresponding to the read image in a bit map memory to represent the image of the original. The processor then detects a closed area on the read image, with an edit point as a start point. On the basis of the detection result, control paints an area corresponding to the closed area in a paint-out bit map memory, which is provided in addition to the bit map memory for the original image. The processor sets bits at the addresses in an area to a specific state, which corresponds to the closed area in the paintout bit map memory. The paint-out operation employs a known algorithm and a drawing circuit, which is used exclusively for drawing images.

When an image of an original is a circle graph, for example, as shown in FIG. 14(a), a representation of the graph is stored in a bit map memory for the original image. In paint-out bit map memories, an area of a given plane corresponding to a wedge is painted, as shown in FIGS. 14(b) to 14(d). In this example, only the bit map memory 40b is painted. In general, the determination of which bit map memories are painted depends on the type of the image processing being executed.

Subsequently, the processor performs a regular scan to read the image of the original. In synchronism with this image read, the contents of the bit map memories are read. The contents of the bit map memories designate an edit area of the original image and the type of the image processing. Because a given image processing is performed on the basis of the data in this area, a predetermined image processing can be applied to only the designated area in the original image.

Where the processor employs the above-mentioned image processing method, when a framed area is automatically designated as an edit area, only the coloring function is accepted as the image processing, while other image edit functions, such as delete, pick-up, color-change, and negative/positive-inversion, are rejected. The reason for this will be described with reference to FIGS. 15(a) to 15(c), which show the relationship between the pixels and bits in the bit map memory is presented. Image processing is applied to an image in which a character "S" is enclosed by a square frame. In the figures, shaded portions indicate black portions in the image, and a bold line indicates the size of an original, viz., an image area.

The prescan writes, data 1 into a memory area corresponding to the black portions in the image, as shown in FIG. 15(a). In this example, the initial value of the bit map memory is 0, and a pixel denoted by an asterisk is an edit point or a designated point. The processor paints an area of the bit map memory with a function number N, with the designated point as a start point of the painting and the data 1 as a pattern to delineate the painted area. The data processing function determines a value of the function number N.

During the regular scan, image processing operates on the basis of the bit map memory, to obtain an image in which the area between the frame and the character "S" (dotted area) is colored, as shown in FIG. 15(c).

To apply another image processing function, other than coloring, to the image, the data of the image per se is needed. A color-change function, for example, reads the contents of the bit map memory in synchronism with the regular scan, and applies a predetermined color-change to the image signals obtained by scanning a portion in the bit map memory filled with the function number N corresponding to the color-change. In the image processing method as mentioned above, the area into which the processor writes the function number N is not the area of the figure directly defining the image per se. Therefore, it is impossible to read the function number N from the bit map memory, and apply the color-change function to it.

Another problem with the above-mentioned image processing method is that it gives certain types of image configurations an unnatural appearance. Typically, an operator wishes to color an entire framed area to give it emphasis. When an image of an original contains a character or graphic figure enclosed by a frame, the user designates a point in an area within the frame as an edit point for the coloring edit processing. An area continuous to the edit point in the framed area is colored, but a closed area of character or graphic figure in the framed area is not colored. In the case of a series of characters "PQRS", for example, the character "S" is normally colored, but the characters of "PQR" having closed areas are not colored in the closed areas.

The reason for this will be described by using an example shown in FIGS. 16(a) to 16(c), in which an image of an original has a character P enclosed by a square frame, and image edit processing is applied to the image. As in the case of the character "S", a prescan step writes 1 data into a memory area of the bit map memory corresponding to a black portion in the image, as shown in FIG. 16(a). A subsequent step paints the bit map with the function number N whose value is determined by the type of the image edit processing, with a designated point denoted by "*" as a start point and a 1 bit pattern to delineating the painted area. The bit map memory then has layout of the bit patterns as shown in FIG. 16(b). As shown, the closed area of the character "P" contains the initial value 0 data.

During the regular scan, image edit processing operates on the basis of the bit map memory contents. The resultant image has an unnatural appearance as shown in FIG. 16(c). As shown, the dotted area between the frame and the character "P" is colored, but the closed area of the "P" is not colored. It is evident that the reproduction of graphic figures with closed areas results in an unnatural image.

SUMMARY OF THE INVENTION

With the view of solving the above-mentioned problems, one object of the present invention is to allow any type of the image edit processing to be applied to an area defined by a frame, and to provide a processed image that is relatively free from unnatural appearances.

To achieve these objects, according to one aspect of the current invention, an image processing method comprises the steps of writing a bit map memory with first data, the first data being derived from image data obtained by prescanning an image of an original; painting the bit map memory with second data, using a designated point in an area of the original as a start point of the painting and the first data as a pattern tending to delineate the area painted with the second data; painting the bit map memory with third data, using a start point existing outside the area of the original and the second data as a pattern tending to delineate the area painted with the third data; painting the bit map memory with fourth data, using a designated point as a start point of the painting and the third data as a pattern tending to delineate the area painted with the fourth data; and reading data from the bit map memory in synchronism with reading the image of the original by a regular scan, and processing the read image data in a manner indicated by the fourth data read from the bit map memory.

According to another aspect of the current invention, an image processing apparatus includes means for writing a bit map memory with first data, the first data being derived from image data obtained by prescanning an image of an original; means for painting the bit map memory with second data, using a designated point in an area of the original as a start point of the painting and the first data as a pattern tending to delineate the area painted with the second data; means for painting the bit map memory with third data, using a start point existing outside the area of the original and the second data as a pattern tending to delineate the area painted with the third data; means for painting the bit map memory with fourth data, using a designated point as a start point of the painting and the third data as a pattern tending to delineate the area painted with the fourth data; and means for reading data from the bit map memory in synchronism with reading the image of the original by a regular scan, and processing the read image data in a manner indicated by the fourth data read from the bit map memory.

Another object of the current invention is to allow image editing of a plurality of areas on a single original. This capability includes the ability to perform the same type of processing on each area, or to perform different processing for each area. Where there are a plurality of areas painted with the fourth data, values each equal to that of the fourth data are respectively assigned to the plurality of areas. Values different from the value of the fourth data are respectively assigned to at least two of the plurality of areas.

According to yet another aspect of the current invention, an image processing method comprises writing image data obtained by prescanning an image of an original, as first data, into a bit map memory; performing a first image processing, subsequent to the step of writing the first data into the bit map memory, including the steps of painting the bit map memory with second data, with a designated point in an area of the original as a start point of the painting and the first data as a border of the area painted with the second data; painting the bit map memory with third data, with its start point existing outside the area of the original and the second data as a pattern tending to delineate the area painted with the third data; painting the bit map memory with fourth data, with the designated point as a start point of the painting and the third data as a pattern tending to delineate the area painted with the fourth data; and reading out the contents from said bit map memory in synchronism with the reading of the image on said original by a regular scan, and processing the read out image data of said original in a predetermined manner on the basis of said fourth data as read out; performing a second image processing, subsequent to the step of writing the first data into the bit map memory, including the steps of painting the bit map memory with fourth data, with the designated point in the area of tho original as a start point of the painting and the first data as a border of the area painted with the second data; and reading data from the bit map memory in synchronism with the reading of the image on the original by a regular scan, and processing the read image data of the original in a predetermined manner on the basis of the fourth data as read.

According to yet another aspect of the current invention, an image processing apparatus includes means for writing image data obtained by prescanning an image of an original, as first data, into a bit map memory; means for performing a first image processing, subsequent to writing the first data into the bit map memory, including: means for painting the bit map memory with second data, with a designated point in an area of the original as a start point of the painting and the first data as a border of the area painted with the second data; means for painting the bit map memory with third data, with its start point existing outside the area of the original and the second data as a pattern tending to delineate the area painted with the third data; means for painting the bit map memory with fourth data, with the designated point as a start point of the painting and the third data as a pattern tending to delineate the area painted with the fourth data; and means for reading out the contents from said bit map memory in synchronism with the reading of the image on said original by a regular scan, and processing the read out image data of said original in a predetermined manner on the basis of said fourth data as read out; means for performing a second image processing, subsequent to writing the first data into the bit map memory, including: means for painting the bit map memory with fourth data, with the designated point in the area of the original as a start point of the painting and the first data as a border of the area painted with the second data; and means for reading data from the bit map memory in synchronism with the reading of the image on the original by a regular scan, and processing the read image data of the original in a predetermined manner on the basis of the fourth data as read.

BRIEF DESCRIPTION OF THE DRAWINGS

FIG. 6(a) through 6(d) show change of the bit pattern stored in the bit map memory.

FIG. 6(e) shows an image after processing.

FIG. 8 is a flowchart showing the order of the operation for setting the type of image processing.

FIG. 9 is a flowchart showing the flow of image processing when there are two types of image processing.

FIG. 10 is a flowchart showing the order of the operation when areas subjected to different processing from each other are set for the same original.

FIG. 12 is a circuit diagram showing hardware for enhancing the number of different types of image processing.

FIGS. 13(a) and 13(b) show an image to be processed and an image after processing, respectively.

FIGS. 14(a) through 14(d) show the bit pattern when coloring of an image in a frame is performed by an image processor previously proposed.

DETAILED DESCRIPTION OF THE PREFERRED EMBODIMENTS

Preferred embodiments of an apparatus and of a method of processing an image according to the present invention will be described with reference to the accompanying drawings.

Figure 1:
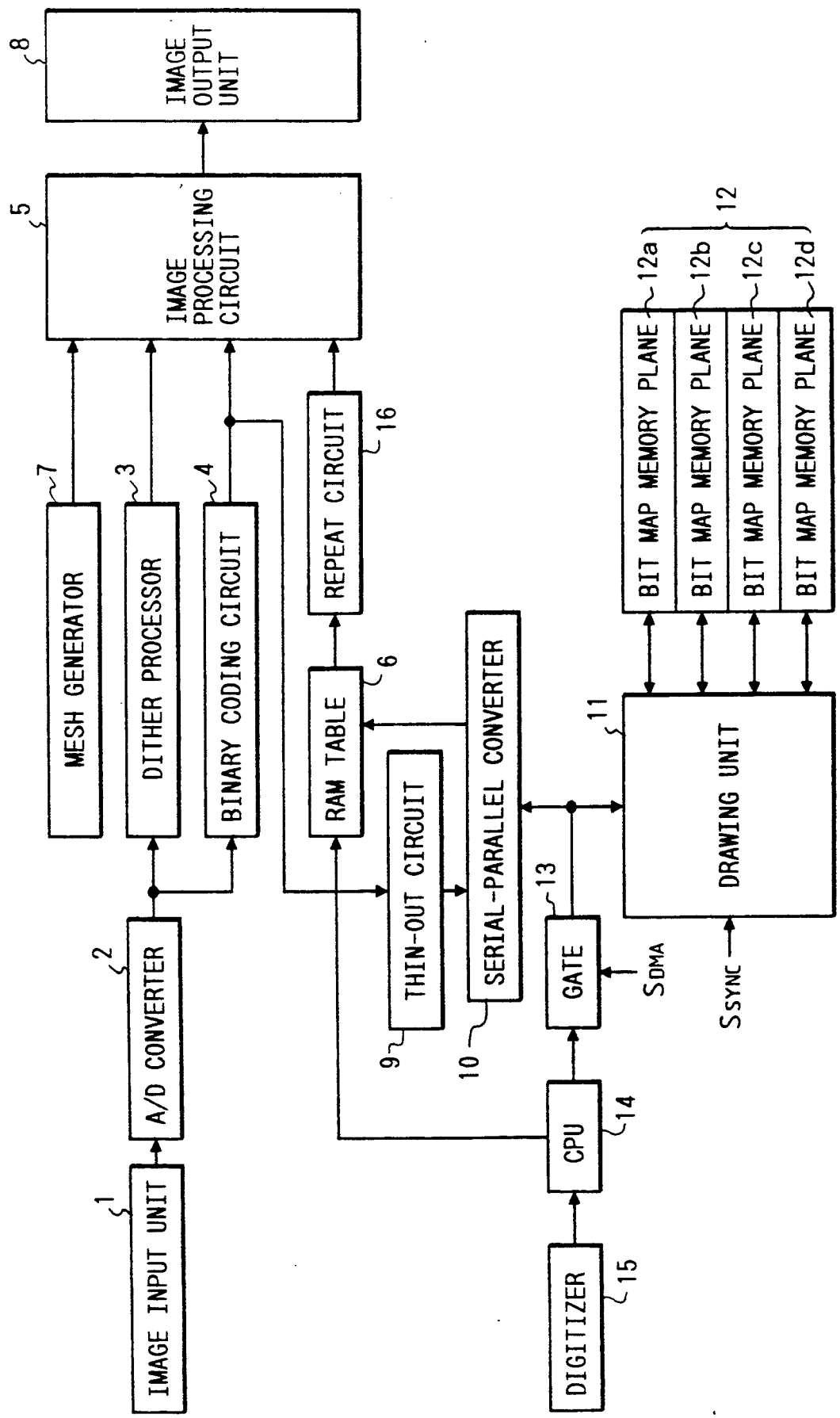
FIG. 1 is a block diagram showing an example of the image processor according to an embodiment of the invention.
Figure 2:
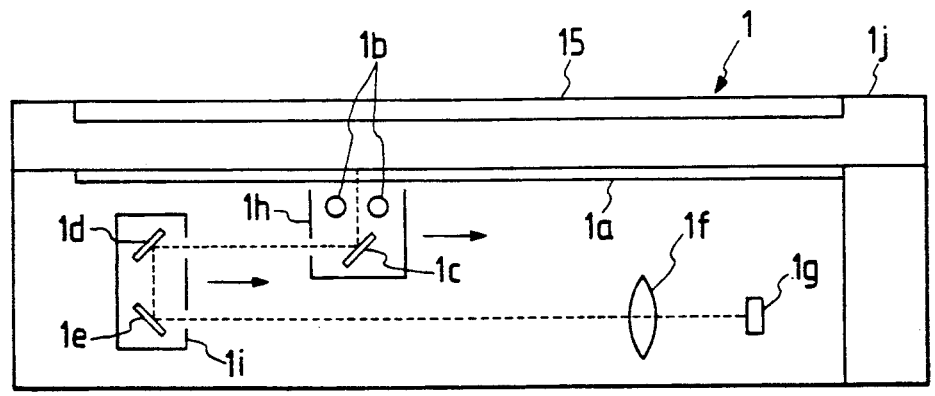
FIG. 2 is a schematic sectional view showing an image input unit and a digitizer.

An image processor for executing the image processing method according to the present invention is shown in block form in FIG. 1. Reference number 1 designates an image input unit for reading an image of an original. As shown in FIG. 2, an original (not shown) is placed on a platen glass 1a, and the image input unit 1, and is illuminated by a light source 1b. Light reflected from the original is successively reflected by a train of mirrors 1c, 1d, and 1e. The light containing image information emanating from the mirror train is focused at image sensor 1g by lens 1f. Upon receipt of the light, image sensor 1g products an image signal. Light source 1b and mirror 1c are mounted on full-speed carriage 1h. Mirrors 1d and 1e are mounted on half-speed carriage 1i. Full-speed carriage 1h moves along and under platen glass 1a in the direction of the arrow. Half-speed carriage 1i moves in the same direction of and at ½ the speed of full-speed carriage 1h. Through the movement of these carriages, the image on the original is read at a resolution of approximately 16 dots/mm (400 dots-/inch).

An image signal derived from image input unit 1 is applied to an A/D (analog to digital) converter 2 where it is converted into a digital signal. A half-tone image on a photograph, for example, is applied to dither processor 3, and then to image processing circuit 5. A 2-value image on an ordinary document containing mostly characters is applied to binary coding circuit 4 and then to image processing circuit 5. RAM (random access memory) table 6 sends data to Image processing circuit 5 through repeat circuit 16. RAM table 6 prestores function codes representing different kinds of image processing functions, such as delete, pick-up, color-change, coloring, and negative/positive-inversion. Image processing circuit 5 performs image processing in accordance with a function code read from RAM table 6. Reference number 7 designates a mesh generator which generates a mesh pattern when the image processor is in a coloring mode. The image data processed by image processing circuit 5 is supplied to a printer, e.g., a laser printer, where it is printed as a visual image. Thus, the original image is edited and copied.

The data signal output from binary coding circuit 4 is also applied through thin-out circuit 9 and serial-parallel converter 10 to drawing unit 11. Drawing unit 11 writes the original image into bit map memory 12, which includes four memory planes 12d to 12a, weighted in the order of 8, 4, 2, 1. For example, writing binary 0010 into a word of one of the memory planes 12d to 12a writes decimal 2 into that word.

Drawing unit 11 is also connected through gate 13 to CPU (central processing unit) 14. Gate 13 is disabled during a period that the scan by the image input unit 1 progresses, viz., data is being transferred between the serial-parallel converter 10 and the drawing unit 11. During other periods gate 13 is enabled.

According to the image processing method that may be exercised in a variety of modes as mentioned above, image data obtained through the prescan is first written into a bit map memory, in the form of first data, e.g., 5. Next, a series of painting operations is performed, which entails setting the bits at the addresses in the closed area to a specific state. A closed area containing a point designated by a user is then painted with data of 3, for example. The entire area outside the closed area is painted with third data of 1, for example, with its start point that is outside the area of the original as a start point of the painting. Further, the bit map memory is painted with fourth data, e.g., a function number N corresponding to certain types of the preset image edit processing, with the designated point as a start point of the painting and the third data as a pattern delineating the area painted with the fourth data. Through the above steps of processing, the closed area is entirely painted with the number N. Then, the number N is set to the value corresponding to the type of the present image edit processing. The contents of the bit map memory are read in synchronism with the reading of the image on the original by a regular scan. The read image data of the original is processed in a predetermined manner on the basis of the number N as read. In this way, the entire area containing a designated point within a frame can be edited with a desired function. The image processing method is applicable for an image in which a closed area contains another closed area.

Figure 3:
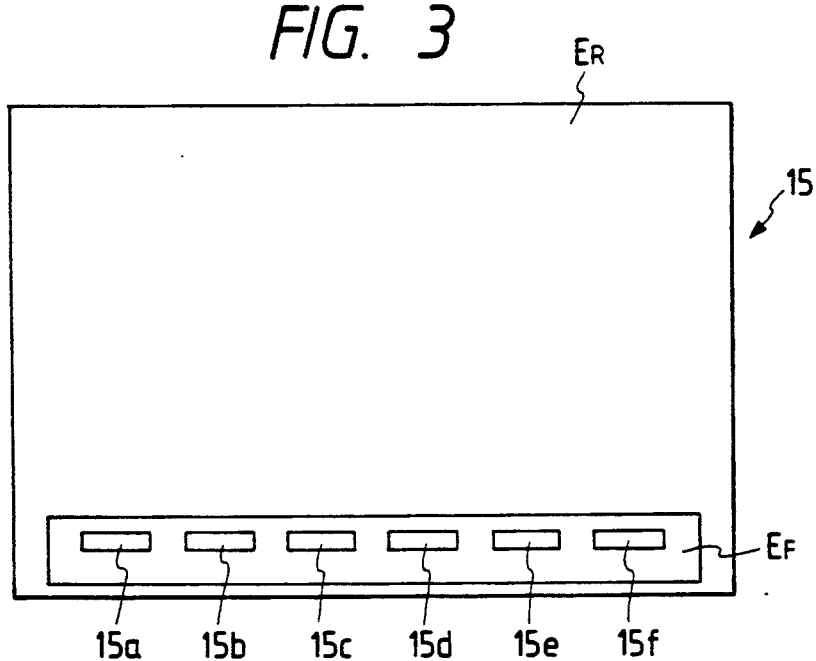
FIG. 3 is a schematic plan view of the digitizer.

To start, the operator places the original to be edited on the edit-area designating area $E_R$ (see FIGS. 2 and 3), and touches window 15a to select frame designation mode for designating the edit area. Then, the operator designates the edit area. To accomplish this, he touches a point (marked with * in FIG. 4(a)) in the area to be colored. The coordinates data of this point is supplied to CPU 14, and stored as a start point of the paint-out into a register or a memory (not shown) in CPU 14. This point may be any position within the area between the character 21 and the frame 22b, and this designation is, therefore, very easy. Then, he touches a window on the digitizer 15 to designate the desired color. He then opens platen cover 1j, places the original on platen glass 1a of the image input unit 1, and closes platen cover 1j.

Figure 5:
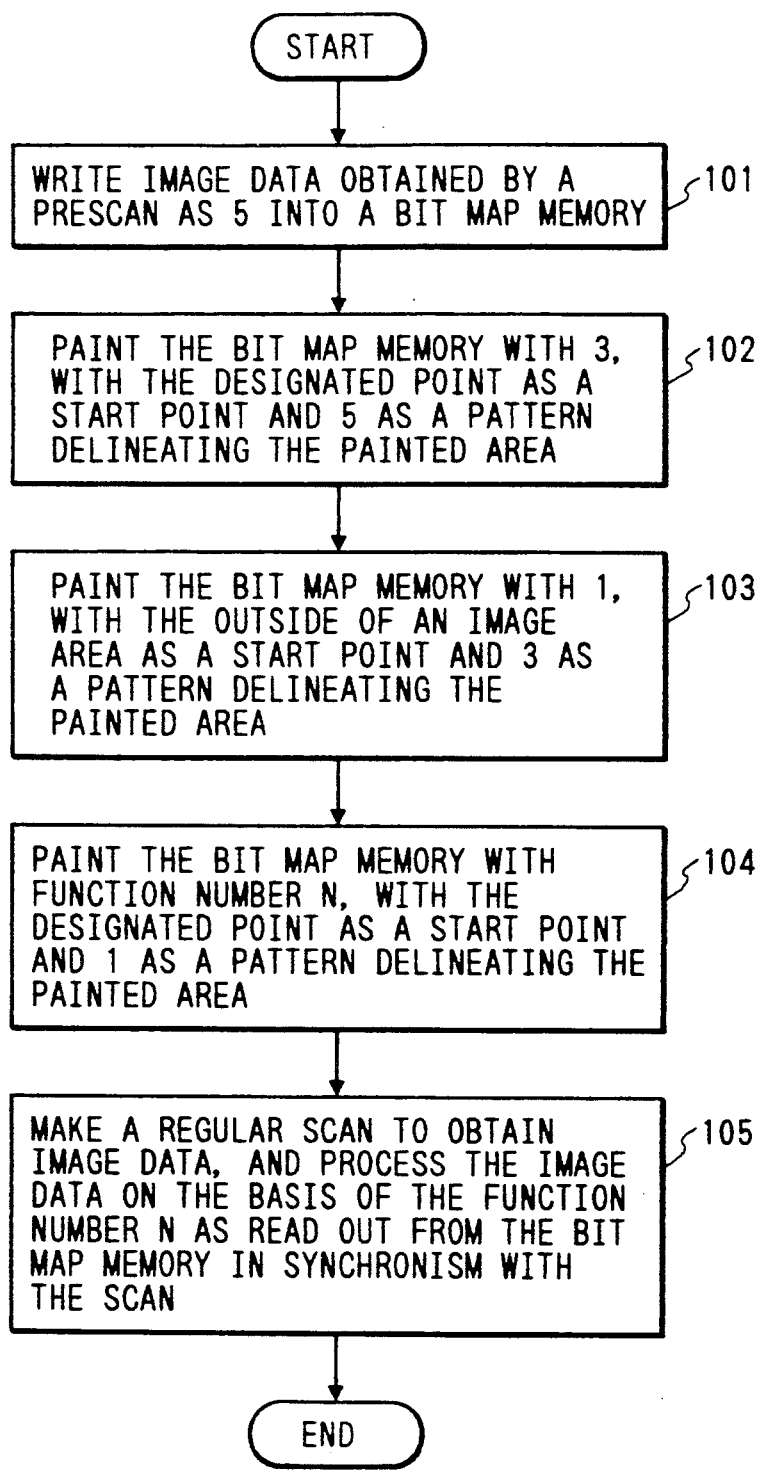
FIG. 5 is a flowchart for explaining the image processing method according to an embodiment of the invention.
Figures 6A, 6B:
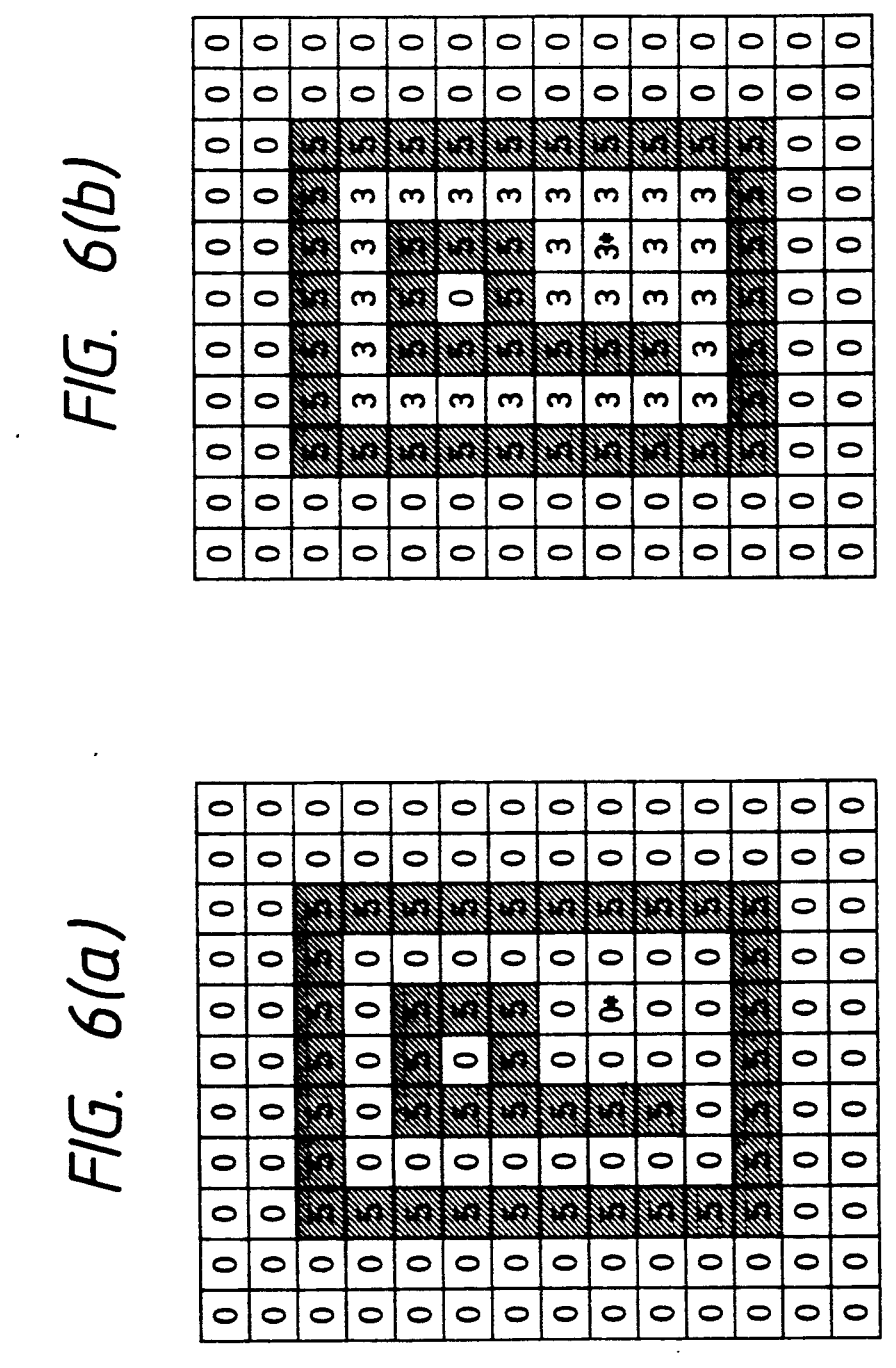

In a method according to a preferred embodiment, the step of writing a first data includes the following: The scan optical system in the image input unit 1 (including the light source 1b, and the mirrors 1c, 1d and 1e) performs a prescan by moving to read the image of the original. The image signal obtained by the image input unit 1 through the prescan is supplied to drawing unit 11, through A/D converter 2, binary coding circuit 4, thin-out circuit 9, and serial-parallel converter 10. Drawing unit 11 writes 5 (binary 0101) into the bit map memory planes 12d to 12a, thereby forming a bit pattern of 5's corresponding to the image on the original as shown in FIG. 6(a) in bit map memory 12 (step 101 in FIG. 5). In this example, the bit pattern of 5 corresponding to the image is written into locations in bit map memory 12. If required, any even number may be used in place of 5. The bit map memory 12 has a continuous address area slightly larger than that need to represent the image area.

In an apparatus according to a preferred embodiment, the means for writing a first data includes the hardware recited in the previous paragraph.

Next, in a method according to a preferred embodiment, the step of writing a second data includes the following: CPU 14 supplies an instruction to paint the closed area through gate 13 to drawing unit 11. In response to the instruction, drawing unit 11 paints a memory area of bit map memory 12 with 3 (step 102). The painting starts from the coordinates of the start point that was designated by digitizer 15. The area painted with 3 exists between the bit patterns of 5. The resultant bit pattern in memory 12 is as shown in FIG. 6(b).

In an apparatus according to a preferred embodiment, the means for writing a second data includes the hardware recited in the previous paragraph, and software executed by CPU 14.

Figures 6C, 6D, 6E:
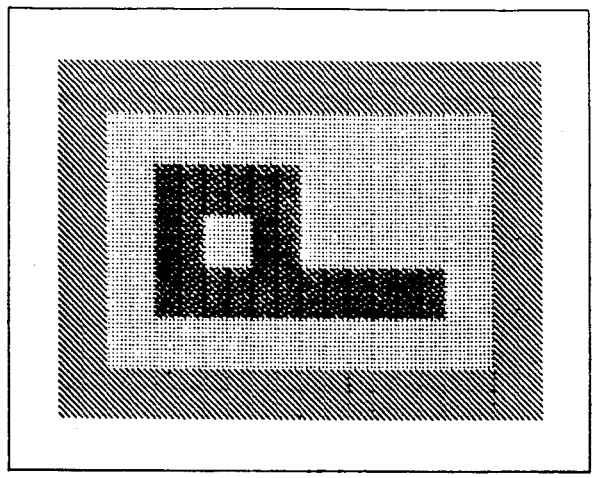

Then, in an method according to a preferred embodiment, the step of writing the third data includes the following: Drawing unit 11 paints an area in the bit map memory, that is outside the bit pattern of 3, with 1 (step 103). The resultant bit pattern is as shown in FIG. 6(c). A start point of the painting with 1 may be any address location in the area outside the image area 30 in the bit map memory 12.

In an apparatus according to a preferred embodiment, the means for writing a third data includes the hardware recited in the previous paragraph.

Subsequently, in a method according to a preferred embodiment, the step of writing fourth data includes the following: The memory area within the bit pattern of 1 is painted with a function number N. That is, in accordance with the kinds of edit processing that is instructed from digitizer 15, bit map memory planes 12 to 12a are painted to have a specific combination of bit patterns. The fourth data is changed in accordance with a kind of image processing. With this feature, different kinds of image edit processing can be performed. A starting point of the painting with data value 1 is the designated point (step 104). The resultant bit pattern in bit map memory 12 is as shown in FIG. 6(d). The function number N is written into the entire area within the frame including the character "P". Image processing circuit 5 processes within this area.

In an apparatus according to a preferred embodiment, the means for writing a fourth data includes the hardware recited in the previous paragraph.

Finally, in a method according to a preferred embodiment, the step of reading data from the bit map memory includes the following: Image input unit 1 makes a regular scan to reread the image on the original. In synchronism with a sync signal $S_{SYNC}$ generated during this image reading, drawing unit 11 serially reads the three upper order bits of the bit patterns from the four memory planes 12d to 12a, viz., the data stored in memory planes 12d to 12b. The read data is applied to serial-parallel converter 10, which in turn transfers a 3-bit address signal to RAM table 6.

In an apparatus according to a preferred embodiment, the means for reading data from the bit map memory includes the hardware recited in the previous paragraph.

The correspondence between the reference number M indicating the kind of the edit processing and the function code has been previously stored in RAM table 6 by CPU 14. Accordingly, a function code corresponding to the painted area in bit map memory 12 is serially read from RAM table 6.

In a preferred embodiment, the data stored in bit map memory 12 results from thinning out the amount of the original image data by a factor of four in the vertical and the horizontal directions. Accordingly, in reading the data, repeat circuit 16 repeats four times the same data in the vertical and the horizontal directions, thereby preserving the correspondence between the original image and the edit area.

The image processing circuit 5 performs an image processing indicated by the function code derived from repeat circuit 16. In case that the image edit is the coloring function, for example, image processing circuit 5 processes the image data signal from dither processor 3 or binary coding circuit 4 by using a mesh signal from mesh generator 7. After image processing, the image signal is transferred to image output unit 8, which in turn produces an image as shown in FIG. 6(e).

Drawing unit 11 is provided for writing image data into bit map memory 12 at a high speed, and may be CRTC (cathode ray tube controller), e.g., HD63484 manufactured by HITACHI company in Japan, a commercially marketed IC (integrated circuit) package exclusively used for the image drawing. Control data (including coordinates data, the type of image processing, etc.) is applied to drawing unit 11. In response to the control data, drawing unit 11 draws a straight line or paints a closed area in bit map memory 12 in accordance with known algorithms.

CPU 14 writes function codes into RAM table 6 and controls drawing unit 11. Specifically, CPU 14 responds to instructions from digitizer 15 to reprogram the contents of RAM table 6 or to instruct which area of bit map memory 12 is painted.

As shown in FIG. 2, digitizer 15 is provided on the upper surface of platen cover 1j, swingable to open and close platen glass 1a of the image input unit 1. Digitizer 15 has a plane whose area corresponds to type A3 paper. When a position on the plane is touched by a suitable means, such as a light pen, digitizer 15 reads the coordinates data of the touched position. The plane of the digitizer consists of ah edit-area designating area $E_R$ for designating an area to be edited and a function designating area $E_F$ for designating the kinds of image processing functions or image edits. The function designating area $E_F$ contains a plurality of windows 15a to 15f corresponding to different kinds of processing. The windows 15a to 15f corresponds to switches for selecting image edit functions such as frame designation, delete, pick-up, color-change, coloring, and negative/positive-inversion. In addition, area $E_F$ contains additional switches (not shown) for designating an edit area using methods other than frame designation. One of the other methods is to designate a rectangular area by the coordinates of two points. Another method is to designate an area of free configuration by a plurality of points. When the edit-area designation area $E_R$ is touched, the CPU 14 processes the coordinates data as area data. When any one of the windows 15a to 15f in the function designation area $E_F$ is touched, it processes the coordinates data as function data.

Figure 4A:
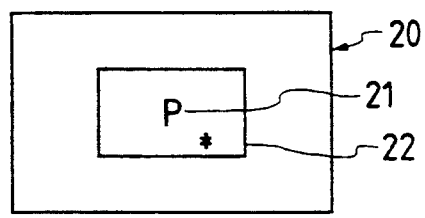
FIGS. 4(a) and 4(b) show an original image and an image processed by the image processing method, respectively, according to an embodiment of the invention.
Figure 4B:
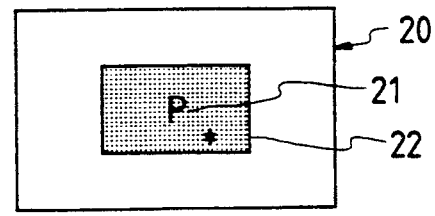

Having described some of the image processor structure, a method of operating the image processor according to an embodiment of the invention will now be described with an example where an image of an original 20 shown in FIG. 4(a) is edited into the image shown in FIG. 4(b). In FIG. 4(a). a character 21 is enclosed by a rectangular frame 22. The area enclosed by the frame 22 is to be colored. The flowchart shown in FIG. 5 will be referred to for explaining the operation. The dotted area in FIG. 4(b) illustrates the colored area.

In this preferred embodiment, the three upper order bits in the four memory planes 12d to 12a are used as a reference number M of the RAM table 6. By the contents, or a function code, of the RAM table 6 corresponding to the reference number, a kind of the processing is designated. Therefore, the status of the memory planes may take 8 ($2^3$) variations. The reference number M, values in memory planes 12d to 12a, and some edit processing functions are listed in Table 1.

TABLE 1

| Ref. No. | Memory planes | | | | Kind of edit |
|---|---|---|---|---|---|
| | 12d | 12c | 12b | 12a | |
| 0 | 0 | 0 | 0 | x | No edit |
| 1 | 0 | 0 | 1 | x | Delete |
| 2 | 0 | 1 | 0 | x | Pick-up |
| 3 | 0 | 1 | 1 | x | Color-change |
| 4 | 1 | 0 | 0 | x | Coloring |
| 5 | 1 | 0 | 1 | x | Nega/posi inv. |
| 6 | 1 | 1 | 0 | x | ... |
| 7 | 1 | 1 | 1 | x | ... |

In the above table, symbol "X" indicates a "Don't care bit", which may be either 1 or 0. The reference numeral M is expressed by the three upper order bits of the function number N, which is 4 bits long. A relationship between the function number N and the reference number M is as shown in Table 2.

TABLE 2

| Function No. N | 0 | 1 | 2 | 3 | 4 | 5 | 6 | 7 |
|---|---|---|---|---|---|---|---|---|
| Ref. No. M | 0 | | 1 | | 2 | | 3 | |
| Function No. N | 8 | 9 | 10 | 11 | 12 | 13 | 14 | 15 |
| Ref. No. M | 4 | | 5 | | 6 | | 7 | |

In the painting of step 104, bit map memory 12 is successively painted about the start point by drawing unit 11. When a closed loop coincident with the function number N is contained in the area to be painted, the loop cannot be painted. In this embodiment, odd numbers are assigned to the data of the character portions, viz., the data written through the prescan, while the even number, to the function number N. Subsequently, CPU 14 sets up a function code in the RAM table 6.

The correspondence between the reference number M and the edit functions shown in Table 1 is flexible and not fixed. If necessary, it can be flexibly changed by an instruction from CPU 14. In case where 8 bits are used for expressing the function codes actually used for instructing the image processing circuit 5, a maximum of 256 kinds of edits can be used. By reprogramming the contents of the RAM table 6, it is possible to simultaneously designate 7 different kinds of edits.

Since the function number N has been written into the entire area within frame 22 including character 21, edit functions other than coloring is possible. For example, the color-change function can be performed by reading the contents of bit map memory 12 in synchronism with the regular scan, the color of an image data signal being changed to the desired color when the function number N is read. If the polarity of the image data signal in the N written area is inverted, the negative/positive-inversion function is exercised. If only the image data signal in this area is to be picked up, the pick-up edit function is exercised.

A more detailed description of the hardware methods of the preferred embodiments will now be described. A DMA (direct memory access) method writes data into bit map memory 12. In both prescan mode in which the memory must be operated at a high speed and regular scan mode, a DMA control signal $S_{DMA}$, which is generated in synchronism with the scan, disables gate 13 to disconnect drawing unit 11 from CPU 14. With gate 13 disabled, a DMA controller [not shown], which is now not under control of CPU 14, directly writes and read data to and from bit map memory 12. Upon the completion of the prescan mode, gate 13 is reenabled.

In a preferred embodiment, thin-out circuit 9 thins out the image data signal derived from image input unit 1 into a signal having ¼ the data of the image signal in both the vertical and the horizontal directions. Therefore, the image data whose amount is 1/16 of the amount of the original image data is stored into bit map memory 12. Thus, by storing the thinned out data into the memory, a required memory capacity may be considerably reduced, and manufacturing costs may be reduced.

Bit map memory 12 is used for painting a closed area, which described below. It is sufficient to store only the configuration of the image on the original. The required resolution of about 4 dots/mm (100 dots/inch), which is lower than that of the image input 1, will not create a problem in practical use. When the image data is thinned out, the image on the original is successively represented with image unit corresponding to 4 × 4 pixels.

When the 4 × 4 image unit consisting of 16 pixels contains one or more black pixels, the image unit stored into the bit map memory is a unit of black pixels. Accordingly, the continuity of a straight line in the original image is secured, and a closed area can reliably be detected. Some other sampling methods make lines discontinuous, and the detection of closed areas is frequently impossible.

In the description of a preferred embodiment given thus far, one kind of the image edit is applied to the image on the original. If required, a plurality of edit areas may be set up on the image of the original, and be edited in different edit modes. Operations of the image processor when multiple edit, functions are exercised will be described with reference to FIGS. 7a–7d and 8.

In this instance, the delete, pick-up, color-change, coloring, and negative/positive inversion functions are respectively applied to five images $I_1$ to $I_5$ each consisting of double square rings or frame, which are laid out of an original in accordance with a control flow shown in FIG. 8. An operator first touches window 15a shown in FIG. 3 to select frame area designation. Then, he presses a position in an area between the inner and outer frames of the image $I_1$ to designate a start point for painting. Finally, he touches window 15b to select the delete function. The remaining images $I_2$ to $I_5$ are edited in similar ways. In the case of the color-change, coloring, or negative/positive-inversion functions, the designation of the edit mode is followed by the color designation.

Figure 7A:
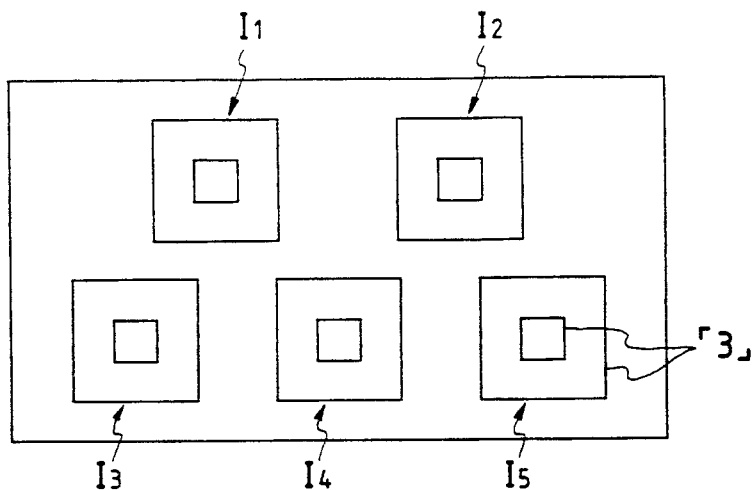
FIGS. 7(a) through 7(d) show change of the bit pattern stored in the bit map memory when a plurality of edit areas subjected to different processing from each other are set up for the same original.
Figure 7B:
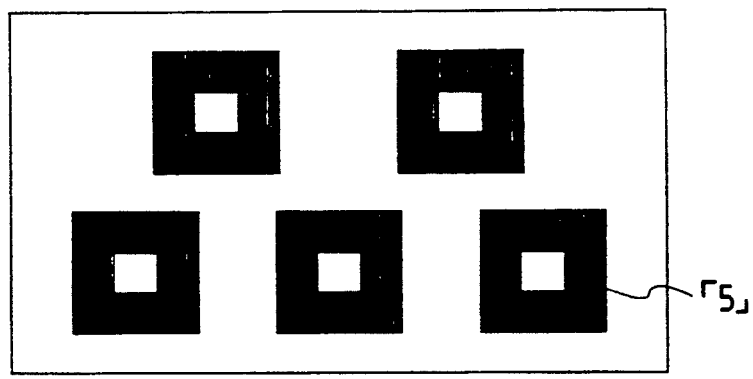
Figure 7C:
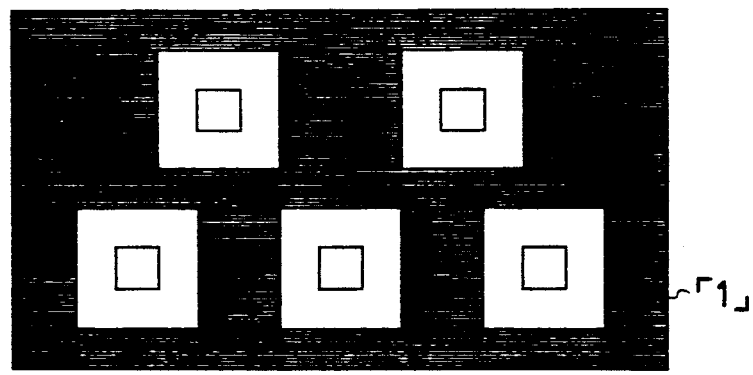
Figure 7D:
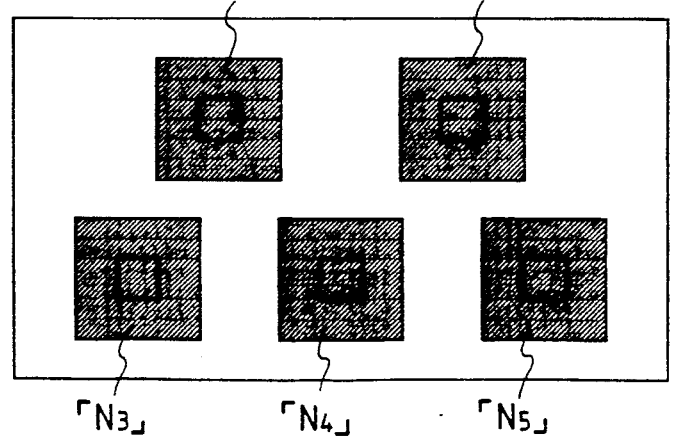

Transitions of bit patterns in bit map memory 12 will be described with reference to FIGS. 7a–7d already stated, a data value of 3 is first written into the images through the prescan (see FIG. 7(a)). Then, an area of each image, which is between the inner and outer frames, is painted with 5, with the bit pattern of 3 as a pattern of delineating the painted area. The painting starts from the designated point in that area (see FIG. 7(b)). The area of the bit map memory except the areas of the images is painted with 1, with the bit patterns of 5 as a pattern delineating the painted area (FIG. 7(c)). The areas of the images are respectively painted by the function numbers of the delete, pick-up, color-change, coloring, and negative/positive-inversion (FIG. 7(d)). The painting of each image area starts from a designated point in the area between the inner and outer frames. In other words, the entire area within the outer frame of each image $I_1$ to $I_5$ is painted with the corresponding function number.

Finally, the contents of bit map memory 12 are read in synchronism with the image reading of the original. The image edits are applied to the images on the original in accordance with the read data. In this way, images $I_1$ to $I_5$ are edited in the different ways.

It is evident that the same image edit is applicable for the different images $I_1$ to $I_5$, if the same function number is assigned to the images $I_1$ to $I_5$.

In the above instance, the entire area within the frame is subjected to the edit processing. Some kinds of images on originals require that the edit be directed to only a closed area contiguous to a designated point in the area within the frame, as in the previously proposed image processing method described above in the BACKGROUND OF THE INVENTION discussion above. Therefore, it is convenient if an image processor exists, which has both the entire area edit function and the closed area edit function in accordance with the kinds of image on the original to be edited.

Figure 16C:
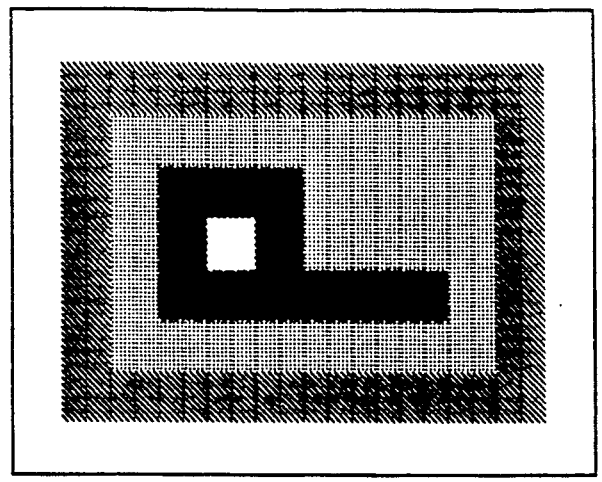
FIG. 16(c) shows an image after processing.
Figure 16B:
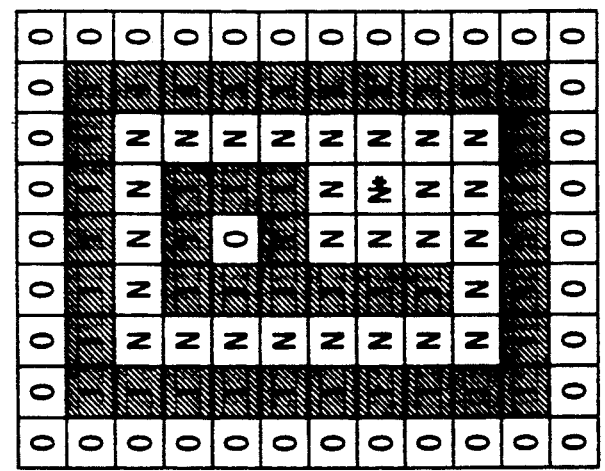
FIGS. 16(a) and 16(b) show change of the bit pattern stored in the bit map memory when the above image processor colors the image having a further closed loop in the frame.
Figure 16A:
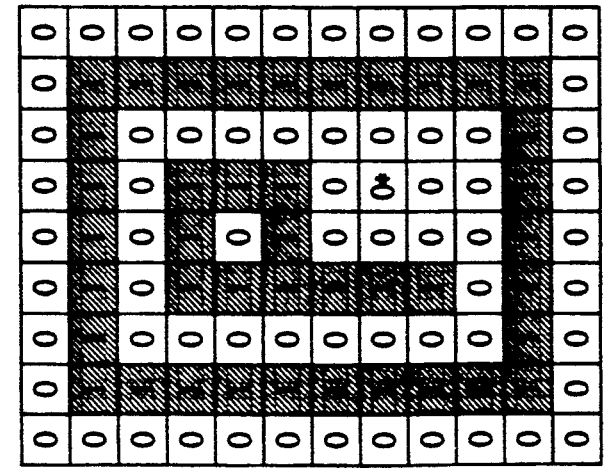

The best way to realize the image processor this dual function is to modify the control flow of the processing to exercise the entire area edit function, as illustrated in FIG. 9. This may be realized as shown in the flowchart of FIG. 9, which is similar to that of FIG. 5, except for step 106. In step 106, the type of the image edit processing is checked. If the edit processing is the coloring function to color a closed area within the frame, control goes to step 107, wherein the closed area is painted with the function number N using a bit pattern of 5 as a pattern delineating the painted area. A bit pattern obtained by this step is equivalent to that of FIG. 6(b) whose 3 is replaced by N. In the next step 105, only the closed area containing the designated point is painted. A subsequent image processing based on the bit pattern in bit map memory 12, produces an output image as shown in FIG. 16(c), which resembles that of the conventional image processor. If the image edit processing is the coloring function to color the entire area within the frame, control goes from step 106 to step 102, traces a route containing steps 102 to 105, and produces the output image as shown in FIG. 6(e). Thus, the flowchart shown in FIG. 9 enables the image processor to appropriately select the image edit function in accordance with the user's desire.

Next, let us consider a case where the two types of edits, the entire-area coloring and the closed-area coloring, are applied to a single original. A sequence of procedural steps of this case is shown in FIG. 10. The flowchart of FIG. 10 is different from that of FIG. 8 in that the coloring processing includes both coloring of the entire area within a frame and coloring of a just closed area within the frame. To exercise the two coloring functions, two windows (not shown) are installed, one to select the entire-area coloring and the other to select the closed-area coloring. A user touches one of the windows in accordance with his desired coloring function.

Figure 11C:
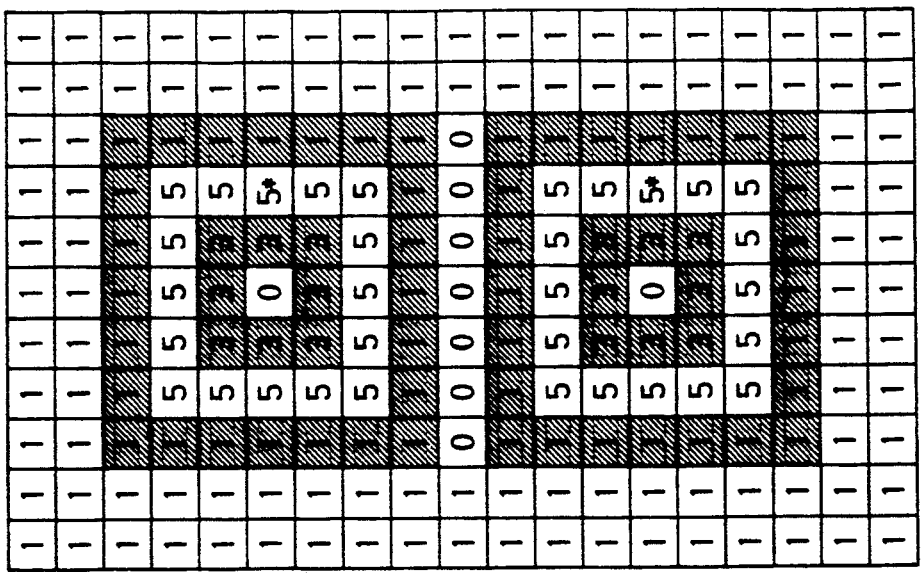
FIGS. 11(a) through 11(d) show change of the bit pattern stored in the bit map memory when a plurality of edit areas subjected to different processing from each other are set up for the same original.
Figure 11B:
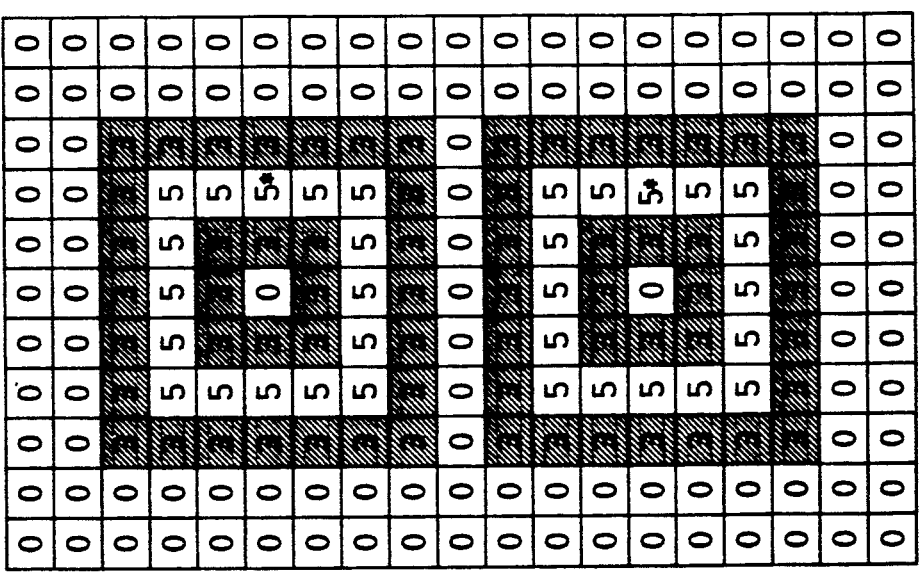
Figure 11A:
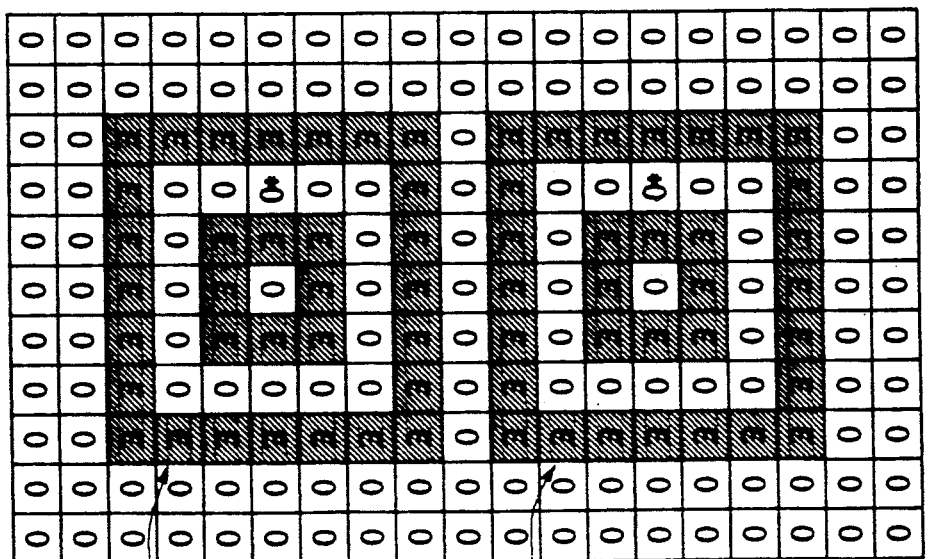

An image of an original to be edited is illustrated in FIG. 11(a). The image contains two images J1 and J2 each consisting of double square rings, a small inner ring and a large inner ring. In this example, the entire-area coloring edit is applied to the image J1, and the closed-area coloring edit, to the image J2.

These edits will be described with reference to the flowchart of FIG. 10. For the image J1, an operator touches window 15a to select the frame designation. Then, he touches a point in an area between the inner and the outer rings or frames to designate a start point of painting, and subsequently touches the window (not shown) to select the designation of the entire-area coloring. For the image J2, he selects the frame designation and designates a start point of painting in a similar way. Then, he touches the window (not shown) to select the closed-area coloring. The data indicating the areas of these images and the types of the images edits are stored in a memory contained in CPU 14 or an external memory.

Figure 11F:
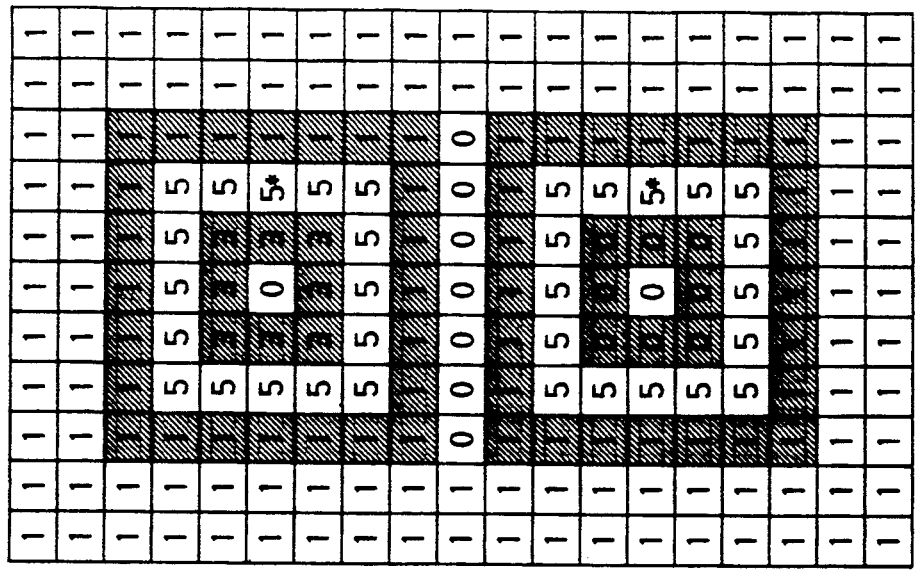
FIG. 11(f) shows another example of a bit pattern.
Figure 11E:
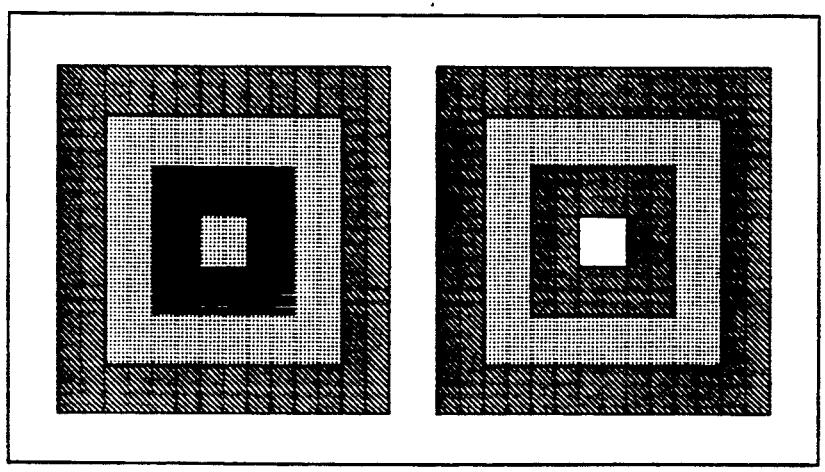
FIG. 11(e) shows an image after processing.
Figure 11D:
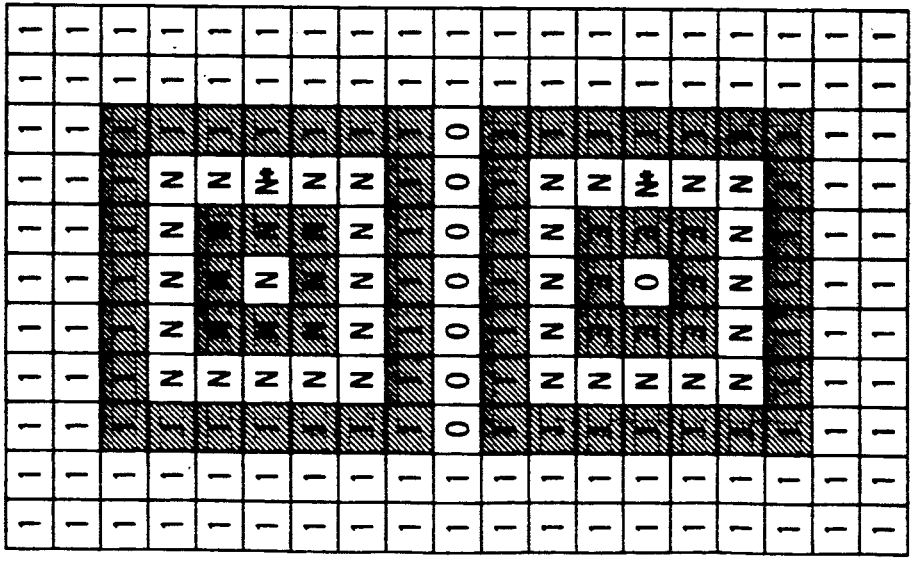
Figure 15C:
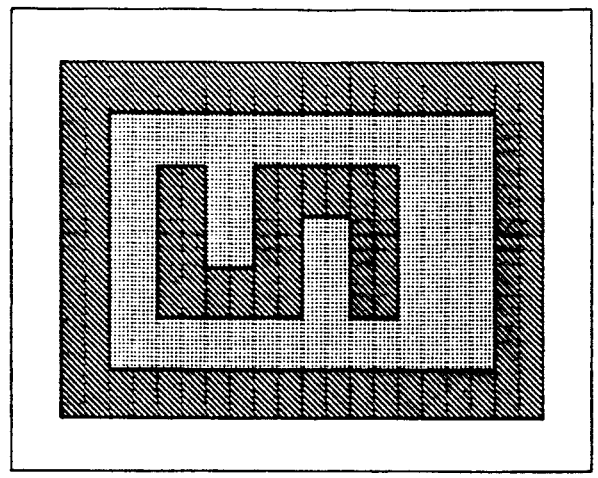
FIG. 15(c) shows an image after processing.
Figure 15B:
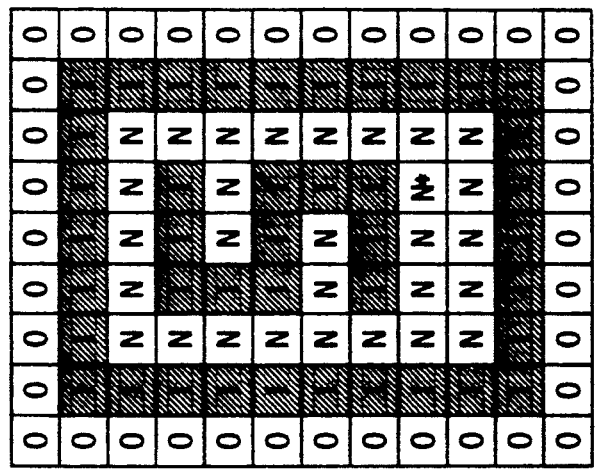
FIGS. 15(a) and 15(b) show change of the bit pattern in detail.
Figure 15A:
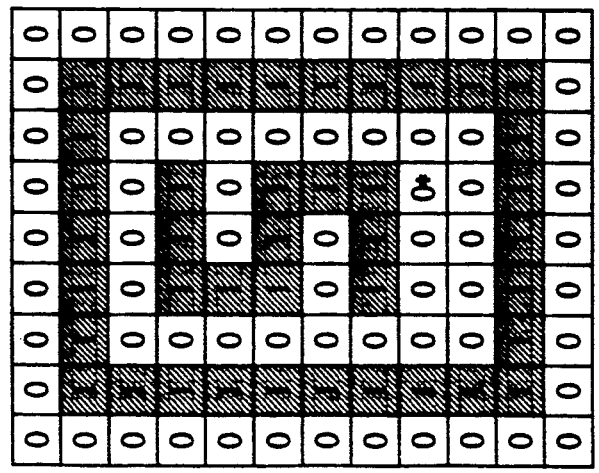

FIGS. 11(a) to 11(d) show a transition of bit patterns when the bit map memory is painted in accordance with the settings as mentioned above. As already mentioned, data 3 is first written in connection with the images, through a prescan (FIG. 11(a)). Then, an area defined by bit patterns of 3 is painted with data 5, starting from a designated point marked with * (FIG. 11(b)). Further, an area outside a bit pattern of 5 is painted with data 1, starting from a start point outside each image (FIG. 11(c)). Finally, for the image J1, an area enclosed by a bit pattern of 1 is painted with a function number N corresponding to the coloring function. For the image J2, an area between the bit pattern of 1 and a bit pattern of 3 is filled with the function number N (FIG. 11(c)). As seen, the image J1 is edited such that the entire area within the outer frame is painted, and the image J2 is edited such that only the closed area between the inner and the outer frames is painted. Subsequently, in synchronism with a regular scan for reading the image on the original, the image processor reads the data from bit map memory 12, and processes the image data in a predetermined manner in accordance with the read out data, and produces an image as shown in FIG. 11(e). As shown, the image J1 in the original image has the painted entire area within the frame, and the image J2 has the painted closed area within the frame. In the image processing method described referring to FIG. 11, when bit map memory 12 is painted with the function number N, data 3 or 0011 in the binary number system is left in the inner frame of the closed area to be subjected to the coloring edit, as shown in FIG. 11(d). As explained previously, in the regular scan mode, the three upper order bits 001 are read from bit map memory 12. It should be avoided that the upper order bits have an effect on the processing of the original image. To this end, the image processing of the data 001 or 1 in the decimal number system must be treated as the "no processing". Accordingly, the number different kinds of image edits except the "no processing", which can be selected, is six.

To address this problem, prior to the step of painting the bit map memory by the fourth data, for the area subjected to the second image processing, the first data is replaced with an initial value of the bit map memory or succeeding to the step of painting the bit map memory by the fourth data, the first data is replaced with an initial value of the bit map memory. For example, data 3 of the area filled with data 3 in the image J2, shown in FIG. 11(c) is replaced data 0, to form a bit pattern as shown in FIG. 11(f). Further, an area between the bit patterns 1 and 0 is painted with N. In connection with the three upper order bits in the bit map memory 12, the outer area than the area filled with N is filled with 0. This corresponds to the "no processing". Therefore, the number of the image edits except the "no processing", which can be selected, is $7(2^3-1)$.

As an alternative to the processing of FIG. 11(f), after the processing of FIG. 11(d), data 3 of the area filled with 3 is replaced with data 0, and the image processing is performed on the basis of the bit pattern.

The software approach as mentioned above may be replaced by a hardware approach as shown in FIG. 12. With the control bit as the least significant bit, the data of the three upper order bits in the bit map memory 12, viz., the output data of the bit map memory planes 12d to 12b, are transferred through three AND gates 7d to 17b to the RAM table 6 (FIG. 1). The data of the least significant bit of the memory 12, viz., the output data of the memory plane 12a, is inverted by an inverter 17a, and applied as a gate signal to the AND gates 17d to 17b.

With such a hardware arrangement, when the least significant bit is 1, the data read from the three upper order bits of the memory 12 are 000. Accordingly, the edit in the image processing circuit 5 is the "no processing". When the hardware approach is used, there is no need for the software procedure as shown in FIG. 11, and the load of the software is reduced as a whole.

In a preferred embodiment as mentioned above, a dedicated IC chip used for the image drawing is used for drawing unit 11. If required, a high speed CPU may be used for CPU 14, with which drawing or writing and reading of data for the bit map memory 12 is performed.

While an embodiment has been described by painting the inframe area, the present invention is applicable for any area, if it is closed, such as bar and circle graphs containing characters.

As seen from the foregoing description, when a bit pattern corresponding to an edit area is formed in the bit map memory, the present invention comprises a method that does not merely paint a single closed area within a framed area, and use the painted area for the edit area. In the present invention, an area outside a framed area is painted with other data, and the framed area is internally painted with additional data. The edited area thus is the entire framed area. In other words, the information of the image of an original is contained in the framed area. Therefore, not only the coloring edit function, but also other edit functions, such as delete, pick-up, and color-change, can be performed such that the image processing is performed on the basis of that area while the original data is being read. Where an image of an original is, for example, a character or a graphic image enclosed by a frame, and an area within the frame is colored, the area is reliably colored, and the coloring is natural irrespective of a figure of the character.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. An image processing method comprising the steps of:

writing image data obtained by prescanning an image of an original, as first data, into a memory;

painting the memory with second data, using a designated point in an area of the original as a start point of the painting and using the first data as a pattern tending to delineate the area painted with the second data;

painting the memory with third data, using its start point existing outside the area of the original and using the second data to delineate the area painted with the third data; and for an area subjected to a first image processing, painting the memory with fourth data, using the designated point as a start point of the painting and using the third data to delineate the area painted with the fourth data;

replacing the first data with an initial value of the memory;

for an are subjected to a second image processing, painting the memory with fourth data, using the designated point as a start point of the painting and using the third and first data as borders of the area painted with the fourth data; and reading the contest from the memory in synchronism with the reading of the image on the original by a regular scan, and processing the read image data of the original in a predetermined manner on the basis of the fourth data as read.

2. An image processing method comprising the steps of:

writing image data obtained by prescanning an image of an original, as first data, into a memory;

painting the memory with second data, using a designated point in an area of the original as a start point of the painting and using the first data as a pattern tending to delineate the area painted with the second data;

painting the memory with third data, using its start point existing outside the area of the original and using the second data to delineate the area painted with the third data; and for an area subjected to a first image processing, painting the memory with fourth data, using the designated point as a start point of the painting and using the third data to delineate the area painted with the fourth data;

for an area subjected to a second image processing, painting the memory with fourth data, using the designated point as a start point of the painting and using the third and first data as borders of the area painted with the fourth data;

replacing the first data with an initial value of the memory; and reading the contents from the memory in synchronism with the reading of the image on the original by a regular scan, and processing the read image data of the original in a predetermined manner on the basis of the fourth data as read. Following the step of painting the memory by the fourth data, the method includes the step of replacing the first data with an initial value of the memory.

3. An image processing apparatus comprising:

means for writing image data obtained by prescanning an image of an original, as first data, into a memory;

means for painting the memory with second data, with a designated point in an area of the original as a start point of the painting and the first data to delineate the area painted with the second data;

means for painting the memory with third data, with its start point existing outside the area of the original and the second data to delineate the area painted with the third data; and means for painting the memory with fourth data, for an area subjected to a first image processing, with the designated point as a start point of the painting and the third data to delineate the area painted with the fourth data;

means for replacing the first data with an initial value of the memory prior to painting the memory with the fourth data, for the area subjected to the second image processing;

means for painting the memory with fourth data, for an area subjected to a second image processing, with the designated point as a start point of the painting and the third and first data as borders of the area painted with the fourth data; and means for reading the contents from the memory in synchronism with the reading of the image on the original by a regular scan, and processing the read image data of the original in a predetermined manner on the basis of the fourth data as read.

4. An image processing apparatus comprising:

means for writing image data obtained by prescanning an image of an original, as first data, into a memory;

means for painting the memory with second data, with a designated point in an area of the original as a start point of the painting and the first data to delineate the area painted with the second data;

means for painting the memory with third data, with its start point existing outside the area of the original and the second data to delineate the area painted with the third data; and means for painting the memory with fourth data, for an area subjected to a first image processing, with the designated point as a start point of the painting and the third data to delineate the area painted with the fourth data;

means for painting the memory with fourth data, for an area subjected to a second image processing, with the designated point as a start point of the painting and the third and first data as borders of the area painted with the fourth data;

means for replacing the first data with an initial value of the memory prior to painting the memory with the fourth data, for the area subjected to the second image processing; and means for reading the contents from the memory in synchronism with the reading of the image on the original by a regular scan, and processing the read image data of the original in a predetermined manner on the basis of the fourth data as read.

5. An image processing method comprising the steps of:

writing a memory with first data, the first data being derived from image data obtained by prescanning an image of an original;

painting the memory with second data, using a designated point in an area of the original as a start point of the painting and using the first data to delineate the area painted with the second data;

painting the memory with third data, using a start point existing outside the area of the original and using the second data to delineate the area painted with the third data;

painting the memory with fourth data, using a designated point as a start point of the painting and using the third data to delineate the area painted with the fourth data; and reading data from the memory in synchronism with reading the image of the original by a regular scan, and processing the read image data in a manner indicated by the fourth data read from the memory.

6. The method according to claim 5, further including the step of changing the fourth data in accordance with various types of image processing.

7. The method according to claim 5, wherein the step of painting the fourth data includes the substeps of painting the fourth data includes the and varying the value of the fourth data from area to area.

8. The method according to claim 5, wherein the step of painting the fourth data includes the substeps of painting a plurality of areas with the fourth data; and varying the value of the fourth data from area to area such that the total number of different values of fourth data is least two.

9. An image processing method comprising the steps of:

writing image data obtained by prescanning an image of an original, as first data, into a memory;

performing a first image processing, subsequent to the step of writing the first data into the memory, including the steps of:

painting the memory with second data, using a designated point in an area of the original as a start point of the painting and using the first data as a border of the area painted with the second data;

painting the memory with third data, using its start point existing outside the area of the original and using the second data as a pattern tending to delineate the area painted with the third data;

painting the memory with fourth data, using the designated point as a start point of the painting and using the third data as a pattern tending to delineate the area painted with the fourth data; and reading out the contents from the memory in synchronism with the reading of the image on said original by a regular scan, and processing the read out image data of said original in a predetermined manner on the basis of said fourth data as read;

performing a second image processing, subsequent to the step of writing the first data into the memory, including the steps of:

painting the memory with fourth data, using the designated point in an area of the original as a start point of the painting and using the first data as a border of the area painted with the second data; and reading data from the memory in synchronism with the reading of the image on the original by a regular scan, and processing the read image data of the original in a predetermined manner on the basis of the fourth data as read.

10. An image processing method comprising the steps of:

writing image data obtained by prescanning an image of an original, as first data, into a memory;

painting the memory with second data, using a designated point in an area of the original as a start point of the painting and using the first data as a pattern tending to delineate the area painted with the second data;

painting the memory with third data, using its start point existing outside the area of the original and using the second data to delineate the area painted with the third data; and for an area subjected to a first image processing, painting the memory with fourth data, using the designated point as a start point of the painting and using the third data to delineate the area painted with the fourth data;

for an area subjected to a second image processing, painting the memory with fourth data, using the designated point as a start point of the painting and using the third and first data as borders of the area painted with the fourth data; and reading the contents from the memory in synchronism with the reading of the image on the original by a regular scan, and processing the read image data of the original in a predetermined manner on the basis of the fourth data as read.

11. The method according to claim 10, in which the processing step includes the substep of performing a "no processing" operation when a control bit of the fourth data read of the memory is 1.

12. An image processing method comprising the steps of:

writing image data obtained by prescanning an image of an original, as first data, into a memory;

performing a first image processing, subsequent to the step of writing the first data into the memory, including the steps of:

painting the memory with second data, using a designated point in an area of the original as a start point of the painting and using the first data as a border of the area painted with the second data;

painting the memory with third data, using its start point existing outside the area of the original and using the second data to delineate the area painted with the third data; and painting the memory with fourth data, using the designated point as a start point of the painting and using the third data to delineate the area painted with the fourth data;

performing a second image processing, subsequent to the step of writing the first data into the memory, including the steps of:

painting the memory with fourth data, using a designated point in an area of the original as a start point of the painting and using the first data as a border of the area painted with the second data; and reading data from the memory in synchronism with the reading of the image on the original by a regular scan, and processing the read image data of the original in a predetermined manner on the basis of the fourth data as read.

13. The apparatus according to claim 12, wherein the means for painting the fourth data includes means for painting a plurality of areas with the fourth data; and for varying the value of the fourth data from area to area.

14. The apparatus according to claim 12, wherein the means for painting the fourth data includes means for painting a plurality of areas with the fourth data and for varying the value of the fourth data from area to area such that the total number of different values of fourth data being at least two.

15. An image processing apparatus comprising:
means for writing a memory with first data, the first data being derived from image data obtained by prescanning an image of an original;
means for painting the memory with second data, using a designated point in an area of the original as a start point of the painting and using the first data to delineate the area painted with the second data;
means for painting the memory with third data, using a start point existing outside the area of the original and using the second data to delineate the area painted with the third data;
means for painting the memory with fourth data, using a designated point as a start point of the painting and the third data to delineate the area painted with the fourth data; and
means for reading data from the memory in synchronism with reading the image of the original by a regular scan, and processing the read image data in a manner indicated by the fourth data read from the memory.

16. The apparatus according to claim 15, further including means for changing the fourth data in accordance with various types of image processing.

17. An image processing apparatus comprising:
means for writing image data obtained by prescanning an image of an original, as first data, into a memory;
means for performing a first image processing, subsequent to writing the first data into the memory, including:
means for painting the memory with second data, using a designated point in an area of the original as a start point of the painting and using the first data as a border of the area painted with the second data;
means for painting the memory with third data, using its start point existing outside the area of the original and using the second data to delineate the area painted with the third data;
means for painting the memory with fourth data, using the designated point as a start point of the painting and using the third data to delineate the area painted with the fourth data; and
means for reading out the contents from the memory in synchronism with the reading of the image on said original by a regular scan, and processing the read out image data of said original in a predetermined manner on the basis of said fourth data as read out;
means for performing a second image processing, subsequent to writing the first data into the memory, including:
means for painting the memory with fourth data, with the designated point in the area of the original as a start point of the painting and the first data as a border of the area painted with the second data; and
means for reading data from the memory in synchronism with reading the image of the original by a regular scan, and processing the read image data of the original in a predetermined manner on the basis of the fourth data as read.

18. An image processing apparatus comprising:
means for writing image data obtained by prescanning an image of an original, as first data, into a memory;
means for painting the memory with second data, with a designated point in an area of the original as a start point of the painting and the first data to delineate the area painted with the second data;
means for painting the memory with third data, with its start point existing outside the area of the original and the second data to delineate the area painted with the third data; and
means for painting the memory with fourth data, for an area subjected to a first image processing, with the designated point as a start point of the painting and the third data to delineate the area painted with the fourth data;
means for painting the memory with fourth data, for an area subjected to a second image processing, with the designated point as a start point of the painting and the third and first data as borders of the area painted with the fourth data; and
means for reading the contents from the memory in synchronism with the reading of the image on the original by a regular scan, and processing the read image data of the original in a predetermined manner on the basis of the fourth data as read.

19. The apparatus according to claim 18, in which the processing means includes means for applying a "no processing" operation when a control bit of the fourth data read of the bit map memory is 1.

20. An image processing apparatus comprising:
means for writing image data obtained by prescanning an image of an original, as first data, into a memory;
means for performing a first image processing, subsequent to writing the first data into the memory, including:
means for painting the memory with second data, using a designated point in an area of the original as a start point of the painting and using the first data as a border of the area painted with the second data;
means for painting the memory with third data, using its start point existing outside the area of the original and using the second data to delineate the area painted with the third data; and
means for painting the memory with fourth data, using the designated point as a start point of the painting and the third data to delineate the area painted with the fourth data;
means for performing a second image processing, subsequent to writing the first data into the memory, including:
means for painting the memory with fourth data, the designated point in the area of the original as a start point of the painting and using the first data as a border of the area painted with the second data; and
means for reading data from the memory in synchronism with the reading of the image on the original by a regular scan, and processing the read image data of the original in a predetermined manner on the basis of the fourth data as read.

* * * * *

UNITED STATES PATENT AND TRADEMARK OFFICE
CERTIFICATE OF CORRECTION

PATENT NO. : 5,148,294
DATED : September 15, 1992
INVENTOR(S) : Toshio Kurogane et al.

It is certified that error appears in the above-identified patent and that said Letters Patent is hereby corrected as shown below:

Title page, item [75] Inventors, change "Nagaoka Daiji" to --Daiji Nagaoka--.

Claim 1, column 15, line 24, change "are" to --area--.
Claim 1, column 15, line 29, change "contest" to --contents--.
Claim 7, column 17, line 20, change "the fourth data includes the" to --a plurality of areas with the fourth data--.
Claim 8, column 17, line 56, change "an" to --the--.
Claim 12, column 18, line 52, after "using" change "a" to --the--.
Claim 12, column 18, line 53, after "in" change "an" to --the--.

UNITED STATES PATENT AND TRADEMARK OFFICE
CERTIFICATE OF CORRECTION

PATENT NO. : 5,148,294

DATED : September 15, 1992

INVENTOR(S) : Toshio Kurogane et al

It is certified that error appears in the above-indentified patent and that said Letters Patent is hereby corrected as shown below:

Claim 17, column 19, line 62, change "reading the image of" to --the reading of the image on--.

Signed and Sealed this

Eleventh Day of January, 1994

Attest:

BRUCE LEHMAN

*Attesting Officer*  *Commissioner of Patents and Trademarks*